United States Patent
Rapson, Jr.

(10) Patent No.: US 11,259,972 B2
(45) Date of Patent: Mar. 1, 2022

(54) TECHNIQUES FOR MITIGATING DOMINANT FREQUENCY IMPARTED TO OBJECT

(71) Applicant: Richard C. Rapson, Jr., Maitland, FL (US)

(72) Inventor: Richard C. Rapson, Jr., Maitland, FL (US)

( * ) Notice: Subject to any disclaimer, the term of this patent is extended or adjusted under 35 U.S.C. 154(b) by 0 days.

(21) Appl. No.: 16/508,773

(22) Filed: Jul. 11, 2019

(65) Prior Publication Data

US 2020/0016014 A1 Jan. 16, 2020

Related U.S. Application Data

(60) Provisional application No. 62/696,748, filed on Jul. 11, 2018.

(51) Int. Cl.
*A61G 1/04* (2006.01)
*A61G 11/00* (2006.01)

(52) U.S. Cl.
CPC .............. *A61G 1/042* (2016.11); *A61G 11/00* (2013.01)

(58) Field of Classification Search
CPC .................... A61G 1/042; A61G 11/00; A61G 11/001–009; A61G 2203/723; A61G 1/06; A61G 3/006
See application file for complete search history.

(56) References Cited

U.S. PATENT DOCUMENTS 6,241,059 B1 * 6/2001 Fujita ..................... A61G 3/006
188/267
6,585,240 B1 * 7/2003 Fujita ..................... B60N 2/502
267/136

(Continued)

OTHER PUBLICATIONS

Ogata, Katsuhiko. System Dynamics. 4th ed., Pearson, 2003. (Year: 2003).*

*Primary Examiner* — Carrie R Dorna
(74) *Attorney, Agent, or Firm* — Jefferson IP Law, LLP; Raymond B. Persino

(57) ABSTRACT

A spring supported tray for mitigating a dominant frequency imparted thereto is provided. The spring supported tray includes a tray including a topside and underside, and configured to support an object on the topside, and N springs supporting the tray, N being a positive integer. A first end of each of the N springs is disposed at the underside of the tray. A second end of each of the N springs is disposed so as to receive vibrational motion imparted to the second end of each of the N springs from a source of the vibrational motion, the vibrational motion having a dominant undesired frequency $f_{dom}$. Each of the N springs has a spring constant k defined by the equation:

$$k = \frac{f_n^2 4\pi^2 w}{Ng}$$

where w denotes the collective weight of the tray and the object, g denotes the force of gravity, and $f_n$ denotes a natural frequency of the spring supported tray supporting the object, wherein $f_n$ is a lower frequency than the dominant undesired frequency $f_{dom}$.

6 Claims, 5 Drawing Sheets

(56) References Cited

U.S. PATENT DOCUMENTS

| | | | |
|---|---|---|---|
| 2010/0065364 A1* | 3/2010 | Felchner | F16F 1/3849 |
| | | | 180/381 |
| 2013/0204074 A1* | 8/2013 | Belval | A61G 11/00 |
| | | | 600/22 |
| 2016/0015586 A1* | 1/2016 | Sabota | A61G 11/009 |
| | | | 600/22 |

* cited by examiner

TECHNIQUES FOR MITIGATING DOMINANT FREQUENCY IMPARTED TO OBJECT

CROSS-REFERENCE TO RELATED APPLICATION

This application is based on and claims priority under 35 U.S.C. § 119(e) of U.S. Provisional Application Ser. No. 62/696,748, filed on Jul. 11, 2018, in the U.S. Patent and Trademark Office, the disclosure of which is incorporated by reference herein in its entirety.

BACKGROUND

1. Field

The disclosure relates to techniques mitigating the vibrational motion. More specifically, the disclosure relates to techniques for mitigating the vibrational motion by mitigating a dominant frequency imparted to an object.

2. Description of Related Art

Certain objects may experience detrimental effects when subjected to vibrational motion. Thus, there is a need for techniques for mitigating the vibrational motion.

The above information is presented as background information only to assist with an understanding of the disclosure. No determination has been made, and no assertion is made, as to whether any of the above might be applicable as prior art with regard to the disclosure.

SUMMARY OF THE DISCLOSURE

Aspects of the disclosure are to address at least the above-mentioned problems and/or disadvantages and to provide at least the advantages described below. Accordingly, an aspect of the disclosure is to provide techniques for mitigating vibrational motion.

Another aspect of the disclosure is to provide techniques for mitigating vibrational motion by mitigating a dominant frequency imparted to an object.

Yet another aspect of the disclosure is to provide techniques for vibration reduction and stabilization of an object being transported by a vehicle, wherein vibrational motion imparted to the object from the vehicle during transport has a dominant undesirable frequency.

In accordance with an aspect of the disclosure, a spring supported tray for mitigating a dominant frequency imparted thereto is provided. The spring supported tray includes a tray including a topside and underside, and configured to support an object on the topside, and N springs supporting the tray, N being a positive integer. A first end of each of the N springs is disposed at the underside of the tray. A second end of each of the N springs is disposed so as to receive vibrational motion imparted to the second end of each of the N springs from a source of the vibrational motion, the vibrational motion having a dominant undesired frequency $f_{dom}$. Each of the N springs has a spring constant k defined by the equation:

$$k = \frac{f_n^2 4\pi^2 w}{Ng}$$

where w denotes the collective weight of the tray and the object, g denotes the force of gravity, and $f_n$ denotes a natural frequency of the spring supported tray supporting the object, wherein $f_n$ is a lower frequency than the dominant undesired frequency $f_{dom}$.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
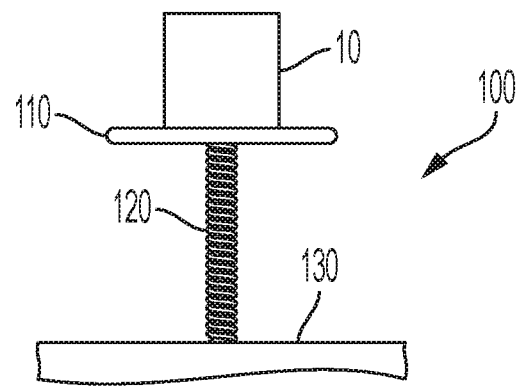
FIGS. 1A and 1B illustrate spring supported trays according to exemplary embodiments.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1A, 1B, 2, 3, 4, 5, and 6 discussed below, and the various embodiments used to describe the principles of the disclosure in this patent document are by way of illustration only and should not be construed in any way that would limit the scope of the disclosure. Those skilled in the art will understand that the principles of the disclosure may be implemented in any suitably arranged communications system. The terms used to describe various embodiments are exemplary. It should be understood that these are provided to merely aid the understanding of the description, and that their use and definitions in no way limit the scope of the disclosure. Terms first, second, and the like are used to differentiate between objects having the same terminology and are in no way intended to represent a chronological order, unless where explicitly stated otherwise. A set is defined as a non-empty set including at least one element.

Techniques for mitigating vibrational motion may employ a spring supported tray. The techniques for mitigating vibrational motion may reduce at least kinetic energy. The spring supported tray may have an object (e.g., a payload) disposed thereon. The spring supported tray may be disposed in an environment experiencing vibrational motion (e.g., during transport of the object by a vehicle) input to the springs of the spring supported tray. The vibrational motion may have a dominant frequency (or frequencies). Springs of the spring supported tray may at least one of suspend, stabilize, or support a tray. The techniques for mitigating vibrational motion may be employed based on selection of the springs of the spring supported tray. The selection of the springs of the spring supported tray may be based on a spring constant k (e.g., stiffness) of the springs. The selection of the springs of the spring supported tray may facilitate the at least one of suspension, stabilization, or support of the tray of the spring supported tray within definable limits. The selection of the springs of the spring supported tray may result in the tray (on which the object is disposed) of spring supported tray having a natural frequency that is less than the dominant frequency. The mitigation of the vibration motions may reduce at least one of excursions or forces, caused by the vibrational motion.

Figure 1B:
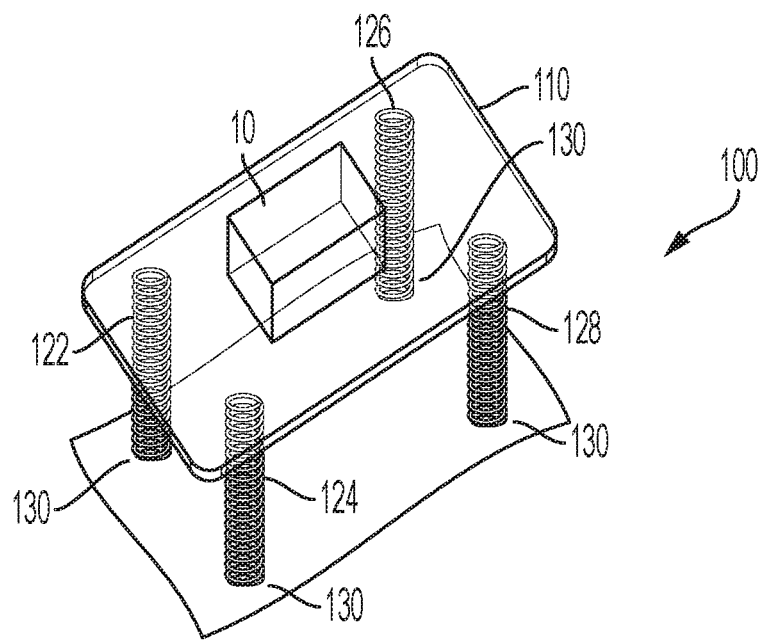

FIGS. 1A and 1B illustrate spring supported trays according to exemplary embodiments.

Referring to FIG. 1A, to support an object 10, the spring supported tray 100 may include a tray section 110. The object 10 may rest freely on a topside of the tray section 110. Alternatively, object 10 may be restrained so as to be mechanically coupled with the tray section 110. The spring supported tray 100 may further include a spring section 120 at least one of suspending, stabilizing, or supporting the tray section 110. The spring section 120 may include one or more metal circular wave springs each having a spring constant k, or one or more of any other springs each having the spring constant k. A first end of the spring section 120 may be disposed so as to contact the underside of tray section 110. A second end of the spring section 120, which is opposite the first end of the spring section 120, may be disposed so as to contact a structure 130. The structure 130 may be a source of vibrational motion, which is imparted to the second end of the spring section 120. Here, the structure 130 may be a singular structure, or a plurality of structures rigidly affixed to each other. The vibrational motion may be parallel to gravity. The structure 130 may be a vehicle, a structure rigidly secured in the vehicle, or any other structure that imparts vibrational motion to the second end of the spring section 120. The vehicle may be a car; a truck such as a heavy duty truck or light duty truck; an ambulance; a train; a helicopter; an aircraft such as a jet, fixed wing aircraft, or rotary wing aircraft; a manned space vehicle; an unmanned; or any other type of conventional, related art, or future type of vehicle. While spring supported tray 100 is shown in FIG. 1A with a single spring, any number N of a plurality of springs may be employed for the spring section 120. For example, as shown in FIG. 1B, N is four and spring section 120 includes springs 122, 124, 126, and 128. The spring section 120 has a spring constant Nk that may be chosen so that the spring section 120 may attenuate the vibrational motion imparted by the structure 130.

When more than one spring is employed for the spring section 120, such as shown in FIG. 1B, each of the plurality of springs employed for the spring section 120 may be substantially the same. Alternatively, any number of the plurality of springs employed for the spring section 120 may be different in at least one aspect of their structure (e.g., dimension, composition, etc.), but all of the plurality of springs employed for the spring section 120 have a substantially same spring constant k, such that Nk is the spring constant of the spring section 120. In yet another alternative, any number of the plurality of springs employed for the spring section 120 may be different in at least one aspect of their structure (e.g., dimension, composition, etc.) and their spring constant k, but with a collective spring constant of the spring section 120 substantially corresponding to a desire spring constant Nk of the spring section 120.

Figure 2:
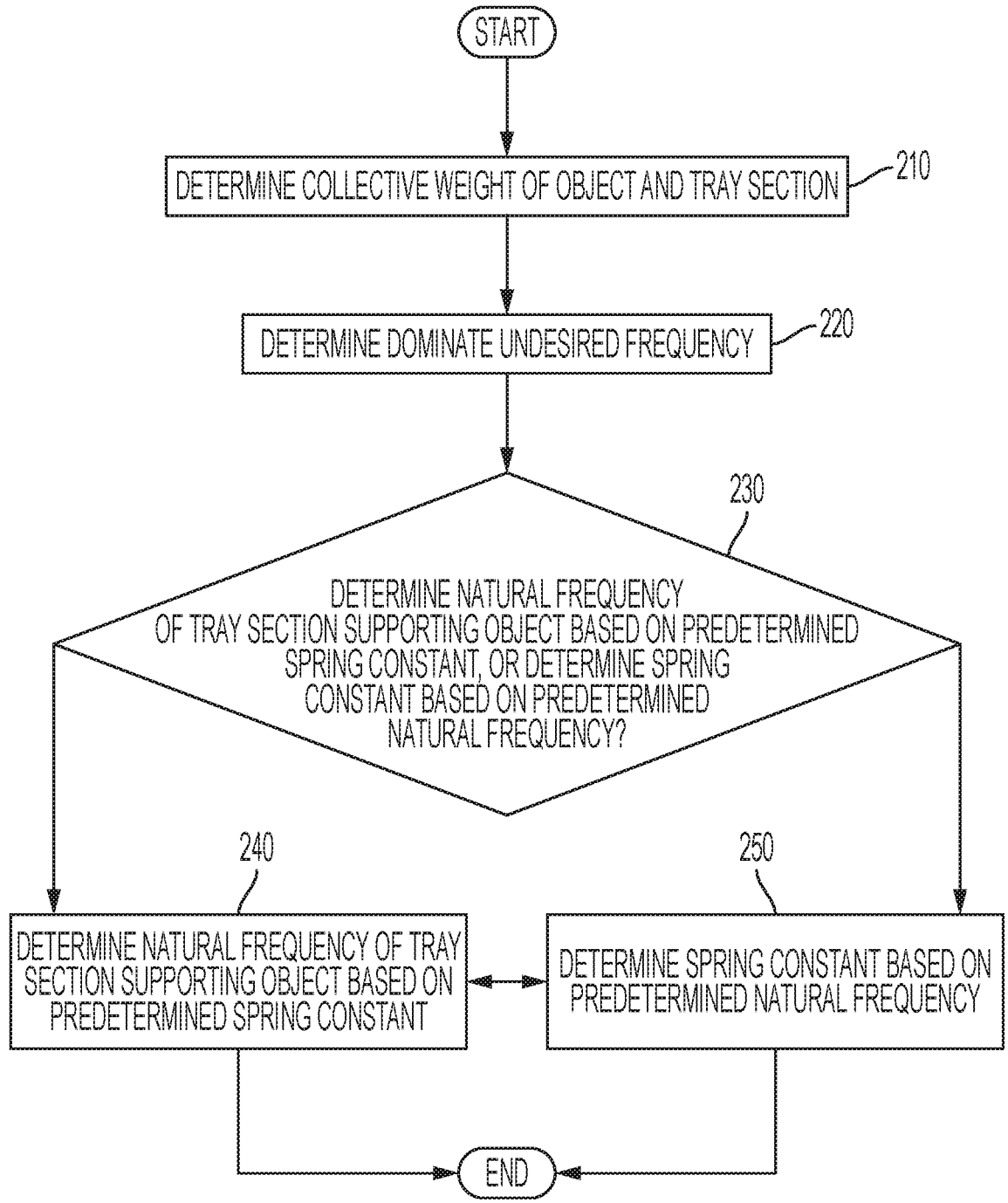
FIG. 2 illustrates a method for selecting springs used for a spring supported tray according to an exemplary embodiment.

FIG. 2 illustrates a method for selecting springs used for a spring supported tray according to an exemplary embodiment.

The method described with reference to FIG. 2 is modeled as a system described by a second order differential equation and Newton's Second Law of Motion:

$$\sum F_i = ma_i = m\frac{d^2 x_i}{dt^2}, i = x, y, z \qquad \text{Equation (1)}$$

In Equation (1), F denotes a force in a given direction i, where x denotes the longitudinal direction, y denotes the lateral direction, and z denotes the vertical direction. Further, m denotes mass, a denotes acceleration in the given direction i, and t denotes time. Stabilization is addressed in one direction at a time.

In operation 210, a collective weight w of the object 10 and the tray section 110 is determined. The choice of springs used for the spring section 120 of the spring supported tray 100 is determined based on the collective weight w of the object 10 and the tray section 110. The collective weight w of the object 10 and the tray section 110 may be determined via any conventional, related art, or future technique for determining the collective weight w of the object 10 and the tray section 110. For example, a scale may be employed to determine the collective weight w of the object 10 and the tray section 110. Here, instead of weight, a collective mass m of the of the object 10 and the tray section 110 may alternatively be determined. The collective mass m may be determined based on the collective weight w and a known value for gravity g using Equation (2).

$$m = \frac{w}{g} \qquad \text{Equation (2)}$$

While the method described with reference to FIG. 2 may be used with the collective mass m of the of the object 10 and the tray section 110 instead of the collective weight w of the object 10 and the tray section 110, the method will be described herein with based on the collective weight w of the object 10 and the tray section 110. However, it would be appreciated by a person of skill in the art of the disclosure how to utilize any of the equations presented herein to use Equation (2) to employ the collective mass m of the of the object 10 and the tray section 110 instead of the collective weight w of the object 10 and the tray section 110.

In operation 220, a dominant undesired frequency $f_{dom}$ of the vibrational motion imparted by the structure 130 is determined. The dominant undesired frequency $f_{dom}$ of the vibrational motion imparted by the structure 130 may be determined using any conventional, related art, or future technique for determining the frequencies of the vibrational motion imparted by the structure 130. For example, the frequencies of the vibrational motion imparted by the structure 130 may be measured through real world measurements or may be computer modeled. The real world measurements may be done by an accelerometer or another sensor configured to sense frequencies of vibrational motion. Once the frequencies of the vibrational motion imparted by the structure 130 are measured or modeled, the dominant frequencies may be determined. Among the dominant frequencies a dominant undesired frequency $f_{dom}$ may be identified. The dominant undesired frequency $f_{dom}$ may be identified based on the most dominant frequency among all the dominant frequencies. Additionally or alternatively, the dominant undesired frequency $f_{dom}$ may be identified based on the effect of a vibrational frequency to the object 10.

Figure 3:
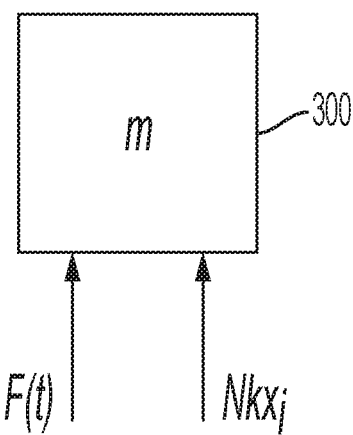
FIG. 3 illustrates a Free Body Diagram (FBD) that models a second order system according to an exemplary embodiment.

FIG. 3 illustrates a Free Body Diagram (FBD) that models a second order system according to an exemplary embodiment.

Referring to FIG. 3, the resulting second order system may be modeled with an FBD as the collective mass m of the of the object 10 and the tray section 110, N springs, and input forces.

Figure 4:
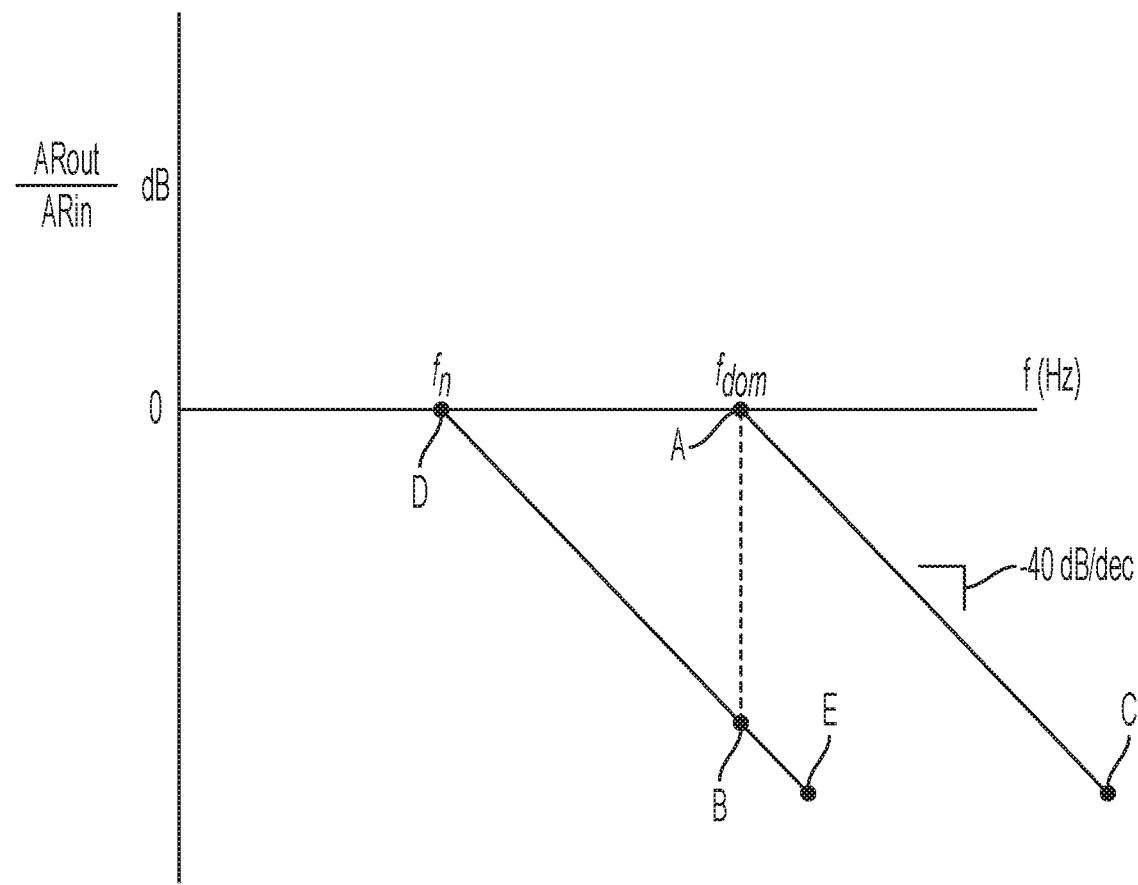
FIG. 4 illustrates a frequency domain response for a modeled second order system according to an exemplary embodiment.

FIG. 4 illustrates a Bode plot showing a frequency domain response for a modeled second order system according to an exemplary embodiment.

Referring to FIG. 4, point A represents the dominant undesired frequency $f_{dom}$. The slope of line AC is −40 decibels/decade and begins at the dominant undesired frequency $f_{dom}$. The Bode plot shown in FIG. 4 is constructed using semi-logarithmic coordinates. The horizontal axis, frequency f is logarithmic. The vertical axis, Amplitude Ratio (AR), is in linear coordinates and represents the decibels of the ratio of output to input amplitude.

Returning to FIG. 2, in operation 230, it is determined whether a natural frequency fn of the tray section 110 supporting the object 10 is to be determined for a given spring constant of Nk of the spring section 120, or whether the spring constant of Nk of the spring section 120 is to be determined based on a given natural frequency fn of the tray section 110 supporting the object 10.

If in operation 230, it is determined that the natural frequency fn of the tray section 110 supporting the object 10 is to be determined, the method proceeds to operation 240.

In operation 240, the natural frequency fn of the tray section 110 supporting the object 10 is to be determined using the given spring constant of Nk of the spring section 120 using Equation (3).

$$f_n = \frac{1}{2\pi}\sqrt{\frac{Nkg}{w}} \qquad \text{Equation (3)}$$

Here, the determined natural frequency fn of the tray section 110 supporting the object 10 may be added to the Bode plot shown in FIG. 4 as line DE. The slope of line DE is −40 decibels/decade and begins at the determined natural frequency fn.

The given spring constant of Nk of the spring section 120 may result in a determined natural frequency fn that leads to an attenuation of the dominant undesired frequency $f_{dom}$ if the natural frequency fn is lower than the dominant undesired frequency $f_{dom}$. If the determined natural frequency fn is the same or higher than the dominant undesired frequency $f_{dom}$, a different spring constant of Nk may be selected, and operation 240 can be repeated. Here, a different spring constant of Nk may be selected with operation 240 being repeated until the determined natural frequency fn is lower than the dominant undesired frequency $f_{dom}$.

In addition, the amount of attenuation (i.e., reduction) of the amplitude ratio achieved by the determined natural frequency fn of the tray section 110 supporting the object 10 may be determined.

Referring back to FIG. 4, the line AB of the Bode plot represents the attenuation (i.e., reduction) of the amplitude ratio indicated by the location of a natural frequency fn of the tray section 110 supporting the object 10 and the dominant undesired frequency $f_{dom}$. The frequency response amplitude reduction, line AB may be represented by Equation (4).

$$20\log_{10}\left|\frac{AR_{out}}{AR_{in}}\right| = AB \text{ decibels} \qquad \text{Equation (4)}$$

Thus, Equation (4) may be used to verify that the spring constant of Nk of the spring section 120 results in a natural frequency fn that provides a sufficient amount of attenuation of the dominant undesired frequency $f_{dom}$.

However, if in operation 230, it is determined that the spring constant of Nk of the spring section 120 is to be determined based on a given natural frequency fn of the tray section 110 supporting the object 10, the method proceeds to operation 250.

In operation 250, the spring constant of Nk of the spring section 120 is determined based on a given natural frequency fn of the tray section 110 supporting the object 10 using Equation (5), which represents the spring constant k for each of the N springs of the spring section 120. The given natural frequency fn of the tray section 110 supporting the object 10 may be chosen to be lower than dominant undesired frequency $f_{dom}$.

$$k = \frac{f_n^2 4\pi^2 w}{Ng} \qquad \text{Equation (5)}$$

Here, the given natural frequency fn of the tray section 110 supporting the object 10 may be chosen to have a target frequency response amplitude reduction by adding line AB in the Bode plot shown in FIG. 4. A line DE may then be added to the Bode plot at point B with a slope of −40 decibels/decade. Then, the natural frequency fn may be determined by point D, which is where the DE line intersects the horizontal axis, frequency f.

If the given natural frequency fn of the tray section 110 supporting the object 10 does not result in a spring constant Nk of the spring section 120 that may be achieved by available springs with a spring constant k, operation 250 may be repeated with a different given natural frequencies fn of the tray section 110 supporting the object 10 that are lower than the dominant undesired frequency $f_{dom}$, until a spring constant Nk of the spring section 120 is determined for which springs with the spring constant k are available.

Accordingly, based on operation 250, the spring constant of Nk of the spring section 120 may be determined for the chosen natural frequency fn. Here, the spring constant of Nk is the collective spring constant of all N springs. Thus, assuming all of the springs are substantially identical, the spring constant for each of the N springs is k.

While not shown in FIG. 2, it may be determined before, during, or after operations 240 or 250 whether damping is to be utilized. Here, a damping constant may be calculated from vibration theory. If damping is to be utilized, the damping may be provided using a passive damping device.

Operations 240 and 250 may be performed each after the other. Also, the operations described with reference to FIG. 2 may begin and end at any of the operations described with reference to FIG. 2. Also, the operations described with reference to FIG. 2 may omit an operation, or may switch the order of two or more operations. For example, the order of operations 210 and 220 may be switched.

The spring supported tray 100 and method for selecting springs used for the spring supported tray 100 described herein may be used when transporting the object 10 where the object 10 may experience vibrations during transport. Thus, the spring supported tray 100 and method for selecting springs used for the spring supported tray 100 has applicability in a wide range of environments. For example, the spring supported tray 100 and method for selecting springs used for the spring supported tray 100 may have applicability to at least one of a neonatal transport incubator or a Newborn Intensive Care Unit (NICU) ambulance.

Newborns may be transported by a NICU ambulance. However, newborns are fragile and thus vibrations imparted to the newborn by the NICU ambulance can have detrimental effects. Newborns that are transported by the NICU ambulance may be transported within a neonatal transport incubator that is rigidly secured within the NICU ambulance during transport. Neonatal transport incubators are typically certified and approved, and thus may not be permitted to be modified. Further, constraints on space, weight and volume limits during transport of a newborn within a neonatal transport incubator may be finite and limited. Thus, there is a need to provide a safer transportation mode for newborns, which are transported via a NICU ambulance within a neonatal transport incubator. Here, the spring supported tray 100 may be utilized within the neonatal transport incubator to mitigate the vibrational motion imparted to the newborn during transportation via the NICU ambulance without a need to modify the neonatal transport incubator.

The spring supported tray 100 for use for within the neonatal transport incubator may include a plurality of springs, such as springs 122, 124, 126, and 128 shown in FIG. 1B. Here, the tray section 110 may be sized to dimensionally fit within the neonatal transport incubator. In addition, the spring supported tray 100 may additionally include a base section 140 as shown in FIG. 5.

Figure 5:
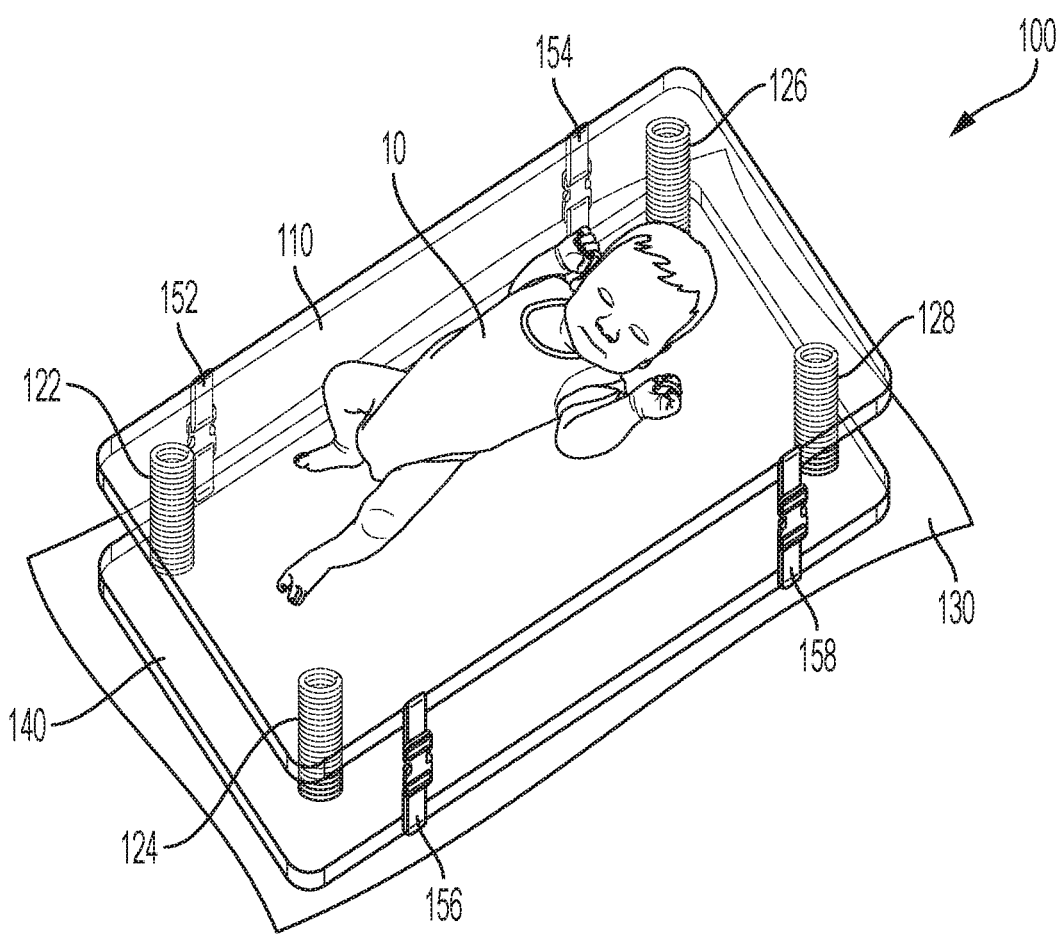
FIG. 5 illustrates a spring supported tray according to an exemplary embodiment.

FIG. 5 illustrates a spring supported tray according to an exemplary embodiment.

Components of the spring supported tray 100 that are common to the spring supported tray 100 shown in FIG. 5 and the spring supported tray 100 shown in FIGS. 1A and 1B are the same and thus a description of those components will be omitted in the description of FIG. 5 for brevity.

Referring to FIG. 5, the spring supported tray 100 further includes the base section 140. Springs 122, 124, 126, and 128 are sandwiched between the base section 140 and the tray section 110. The base section 140 may include a fixing apparatus for fixing the base section 140 to the structure 130. Here, the structure 130 may be the floor of the inside of the neonatal transport incubator. The base section 140 may not include the fixing apparatus, and may instead rest on the structure 130. The spring supported tray 100 may include attachment 150 connecting the tray section 110 to the base section 140. The attachment 150 may be disconnectable. The attachment 150 may be flexible. The attachment 150 would, when disconnected, facilitate cleaning the components of the spring supported tray 100, while securing the upper tray during transport. The attachment may not carry forces or loads that affect the upper tray excursions or response. The attachment 150 may be disconnectable straps or any other apparatus to connect the base section 140 and the tray section 110 while the springs 122, 124, 126, and 128 are sandwiched therebetween. Also, the attachment 150 would, when disconnected, facilitate changing the springs 122, 124, 126, and 128 to different springs. Here, the springs 122, 124, 126, and 128 may be changed to springs with different spring constants k based on the weight of object 10 to be transported. Here, the object 10 may be a newborn.

The tray section 110 may include a support structure to support the object 10 on the tray section 110, which is either affixed to the tray section 110 or unaffixed but resting on the tray section 110.

The spring supported tray 100 based on the spring supported tray 100 shown in FIG. 5 was constructed using springs with a spring constant k determined according the method described with reference to FIG. 2.

While the spring supported tray 100 has been described above with respect to FIG. 5 as being implemented for use inside a neonatal transport incubator, the spring supported tray 100 described above with respect to FIG. 5 may be implemented for use in any environment in which vibrational motion may be mitigated. For example, the spring supported tray 100 described above with respect to FIG. 5 may be used with a stretcher or gurney.

After a spring supported tray 100 is constructed, the constructed spring supported tray 100 may be tested to determine that the spring supported tray 100 is functioning to mitigate a dominant undesired frequency $f_{dom}$ to the constructed spring supported tray 100. Here, real world measurements through, for example, an accelerometer or another sensor configured to sense frequencies of vibrational motion, may be taken. The accelerometer data may be input to engineering software, such as MATLAB, to generate a Power Spectral Density (PSD) distribution diagram, which may be used to determine that the spring supported tray 100 is functioning to mitigate a dominant undesired frequency $f_{dom}$ to the constructed spring supported tray 100. The PSD is an indicator of where the energy in the system is located, within the frequency spectrum. Provided the energy is at frequencies higher (or much higher) than the calculated natural frequency $f_n$ of the upper tray or above (or well above) the frequency of the dominant undesired frequency $f_{dom}$ to the upper tray, the energy in the PSD should not be a factor in exciting the response amplitude of the upper tray.

Figure 6:
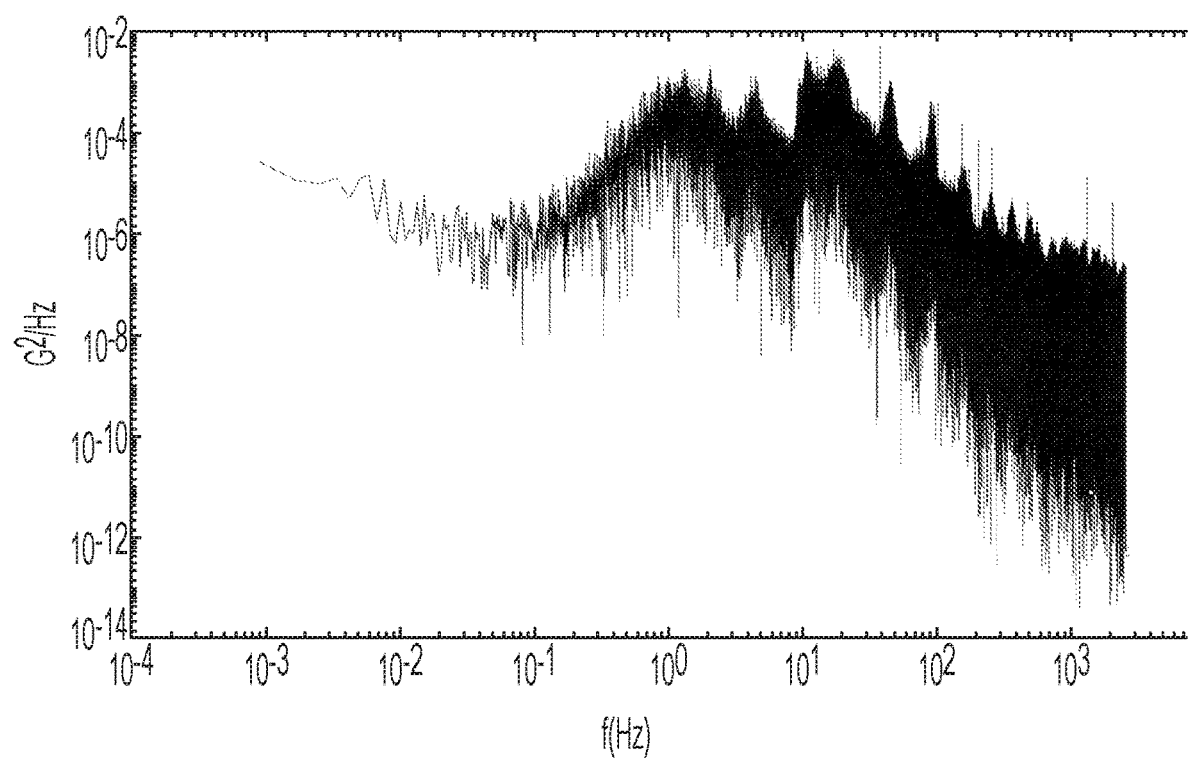
FIG. 6 illustrates an exemplary Power Spectral Density (PSD) distribution diagram according to an exemplary embodiment.

FIG. 6 illustrates an exemplary PSD distribution diagram according to an exemplary embodiment.

The PSD shown in FIG. 6 in measured from an exemplary spring supported tray constructed according to the techniques described herein, and is provided herein merely as a representation of a PSD of a spring supported tray 100. A different spring supported tray 100 constructed according to the techniques described herein may result in a PSD that is the same or different than the PSD shown in FIG. 6. Each spring supported tray 100 constructed according to the techniques described herein may have a PSD unique to the particular constructed spring supported tray 100.

As shown in the FIG. 6, the energy in the exemplary PSD is in the higher frequencies. Thus, as seen in FIG. 6, an exemplary spring supported tray 100 that was constructed according to the techniques described herein, which was measured to generate the PSD shown in FIG. 6, mitigates the dominant undesired frequency $f_{dom}$ to the tray section 110.

While some features that are common to some embodiments have been discussed above, not all features that are common have been discussed above and not all features discussed above are common to all embodiments. Further, it would be apparent to one of skill in the art that variations to the location, dimensions, angles, radiuses, number of parts, and the like, may be made within the scope of the disclosure. That is, any combination of any aspect of the spring supported tray 100 described or illustrated herein either explicitly, inherently, or implicitly are an embodiment of the disclosure.

At this point it should be noted that the embodiments as described above may involve the processing of input data and the generation of output data to some extent. This input data processing and output data generation may be implemented in hardware, or software in combination with hardware. For example, specific electronic components may be employed in a mobile device, computer, or similar or related circuitry for implementing the functions associated with the embodiments of the disclosure. Alternatively, one or more processors operating in accordance with stored instructions (i.e., code) may implement the any of the functions associated with the embodiments of the disclosure. If such is the case, it is within the scope of the disclosure that such instructions may be stored on one or more non-transitory processor readable mediums. Examples of the non-transitory processor readable mediums include Read Only Memory (ROM), Random Access Memory (RAM), Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the embodiments can be easily construed by programmers skilled in the art to which the disclosure pertains While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed:

1. A spring supported tray for mitigating a dominant undesired frequency imparted thereto, the spring supported tray comprising:

a tray including a tray topside and a tray underside, and configured to support an object on the tray topside; and N springs supporting the tray, N being a positive integer, wherein a first end of each of the N springs is disposed at the tray underside, wherein a second end of each of the N springs is disposed so as to receive vibrational motion imparted to the second end of each of the N springs from a source of the vibrational motion, the vibrational motion having a dominant undesired frequency $f_{dom}$ that is a most dominate frequency among a plurality of dominate frequencies that are determined via one of a measurement by a sensor or computer modeling, wherein each of the N springs has a spring constant k defined by an equation:

$$k = \frac{f_n^2 4\pi^2 w}{Ng}$$

wherein w denotes a collective weight of the tray and the object, g denotes the force of gravity, and $f_n$ denotes a natural frequency of the spring supported tray supporting the object, and wherein the $f_n$ is chosen such that the dominant undesired frequency $f_{dom}$, which is the most dominate frequency among the determined plurality of dominate frequencies, is attenuated by a selected amount of decibels using a Bode plot having a logarithmic horizontal axis corresponding to frequency and a linear vertical axis corresponding to decibels of a ratio of output to input amplitude, the $f_n$ being a frequency on the logarithmic horizontal axis of the Bode plot corresponding to a line extending from the $f_n$ on the logarithmic horizontal axis of the Bode plot with a slope of −40 decibels per decade that intersects an end of a vertical line segment extending from the dominant undesired frequency $f_{dom}$ on the logarithmic horizontal axis of the Bode plot with a length corresponding to the selected amount of decibels.

2. The spring supported tray of claim 1, wherein each of the N springs is a metal circular wave springs having substantially a same spring constant k.

3. The spring supported tray of claim 1, wherein the spring supported tray is disposed within a neonatal transport incubator, and wherein the object is a human baby.

4. The spring supported tray of claim 3, wherein the source of the vibrational motion is an ambulance in motion in which the neonatal transport incubator is rigidly fixed.

5. The spring supported tray of claim 1, wherein the source of the vibrational motion is a vehicle in motion.

6. The spring supported tray of claim 1, further comprising:

a base including a base topside and a base underside, wherein the second end of each of the N springs is disposed at the base topside, and wherein the base underside receives the vibrational motion from the source of the vibrational motion and passes the vibrational motion to the second end of each of the N springs.

* * * * *